Dec. 31, 1968   H. G. HERWIG   3,419,153
SCUM REMOVER
Filed Dec. 2, 1966
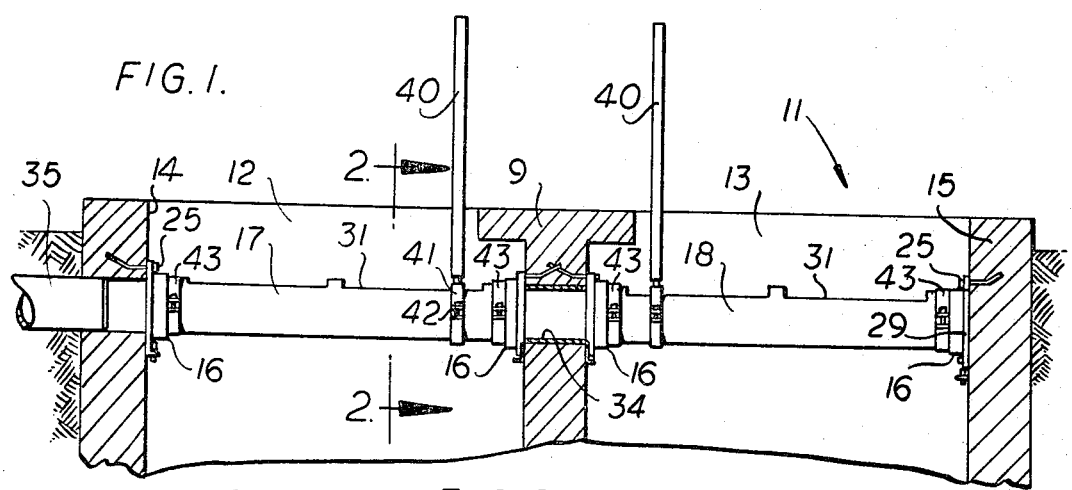
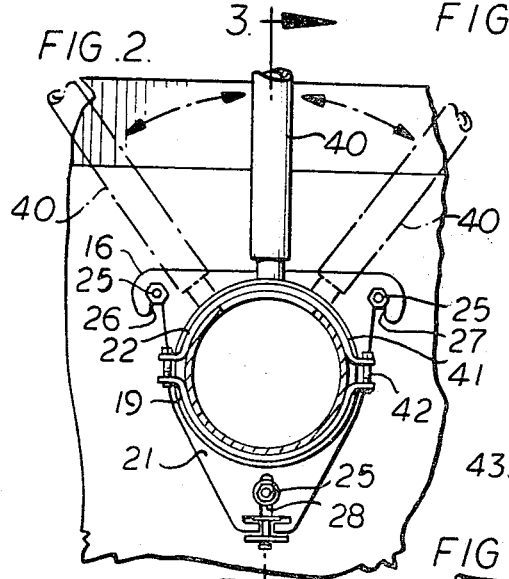
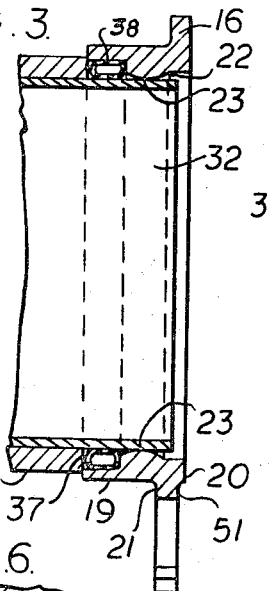
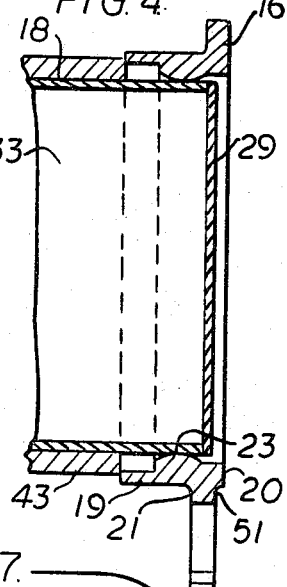
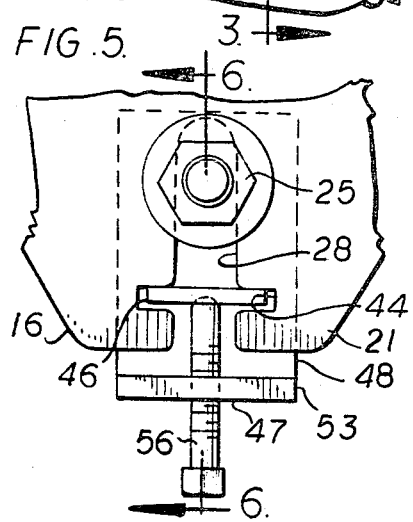
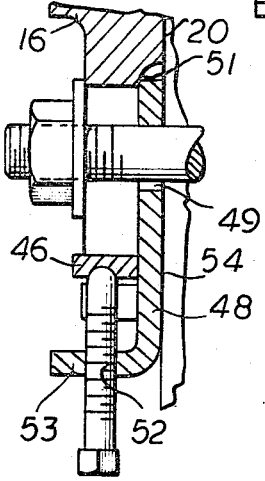
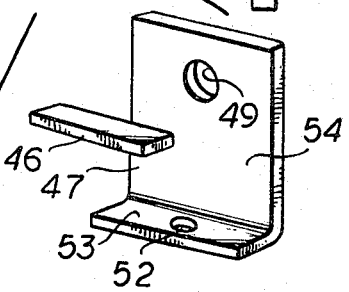
INVENTOR
HENRY G. HERWIG
William Turner
ATTY

United States Patent Office 3,419,153
Patented Dec. 31, 1968

3,419,153
SCUM REMOVER
Henry G. Herwig, Chalfont, Pa., assignor to FMC Corporation, a corporation of Delaware
Filed Dec. 2, 1966, Ser. No. 598,778
3 Claims. (Cl. 210—525)

ABSTRACT OF THE DISCLOSURE

Bearing means for supporting and mounting a material removing trough within a tank adapted for containing a liquid from which floating material is to be removed. A bearing means is disposed on each of the opposed end portions of the trough and adjustably secured to opposite wall portions of the tank. Each bearing means includes a cylindrical body portion having a bore formed with an inwardly projecting spherical bearing surface to permit misalignment of the longitudinal cylinder axis of the trough with the cylinder axis of the bore. Flange portions extend radially outwardly from the body portion and are formed with downwardly opening slots adapted to adjustably engage bolts extending from and mounted on the tank walls for securing the bearing means to the tank walls. An adjustment mechanism, including an L-shaped bracket having a threaded aperture formed in one leg thereof and a screw threaded into the aperture for engaging an abutment member associated with the flange, cooperates with one of the wall mounted bolts to cause vertical adjusting movement of the bearing means in response to vertical movement of the threaded screw to permit proper horizontal alignment of the trough within the tank.

---

This invention relates generally to a tank for containing a liquid from which floating material is to be removed, and more particularly to a new and improved material removing trough and bearing assembly therefor. For purposes of disclosure the invention has been illustrated in the accompanying drawings and will be herein described in connection with a sedimentation tank of a type commonly employed in sewage disposal systems, although it will be readily apparent to those skilled in the art that the apparatus is by no means limited to this field.

In sewage disposal work it is common practice to introduce the raw sewage into settling tanks, or receptacles. Ordinarily these tanks are elongated concrete vats through which the sewage flows at a low velocity to allow the heavier materials to settle to the floor of the tank. The sewage in the tank will often contain a froth and floating debris which will be collected by suitable means at one end of the tank. Periodically this collected floating material will be skimmed from the surface of the liquid by means of a scum trough, an elongated horizontally extending slotted chamber rotatably mounted at the upper end of the tank.

In the past various troughs have been provided to skim the floating material from the surface of the liquid sewage, however, difficulty has been encountered in the past in positioning the trough in accurate horizontal alignment within the tank and removing the trough therefrom. Also misalignment of the trough within its supporting members has hindered rotation of the trough alternatively from its operatble to non-operable positions.

It is therefor the primary object of the present invention to provide a new and improved scum romoving trough for liquid sewage treatment apparatus and the like.

Another important object of the invention is to provide an improved scum removing trough bearing and seal arrangement for supporting the trough within the sedimentation tank.

Still another object of the invention is to provide a scum trough bearing member adopted for adjustable alignment upon the wall of the treatment tank.

A further object of the invention is to provide an adjustment assembly to align the trough bearing member.

Other objects and advantages of the invention will be apparent during the course of the following description.

In the accompanying drawings forming a part of this specification and in which like reference characters are employed to designate like parts throughout the same:

FIGURE 1 is a longitudinal elevational view, partly in section, illustrating a twin tank sewage disposal system provided with a scum trough and bearing assembly of the present invention.

FIGURE 2 is an enlarged sectional view taken on line 2—2 of FIG. 1 and illustrating the bearing assembly and various positions of the scum trough and lever bar in phantom.

FIGURE 3 is a cross-sectional view taken on line 3—3 of FIG. 2 and showing a bearing assembly illustrating one embodiment of the invention.

FIGURE 4 is a cross-sectional view similar to FIG. 3 showing a bearing assembly illustrating another embodiment of the invention.

FIGURE 5 is an enlarged fragmentary view of the bearing alignment apparatus of the present invention as illustrated in FIG. 2.

FIGURE 6 is a sectional view of the bearing alignment apparatus taken on lines 6—6 of FIG. 5.

FIGURE 7 is an exploded view illustrating the relationship of the bracket and abutment member of the bearing alignment apparatus of FIG. 6.

In the drawings, wherein for the purpose of illustration is shown a preferred embodiment of the invention and first particularly referring to FIG. 1, reference character 11 designates a twin tank sewage disposal system having chambers 12 and 13. Adjustably mounted on the inner surfaces of the outer walls 14 and 15 respectively of chambers 12 and 13 and on the opposite surfaces of the intermediate wall 9 are bearing assemblies 16 adapted to horizontally support scum troughs 17 and 18 for rotatable movement therein. The chambers 12 and 13 are provided to receive liquid sewage in a known manner for treatment therein. With liquid sewage present within the chambers 12 and 13, a layer of scum and froth (not shown) floats to the surface of the sewage and is collected by appropriate means to one end of the chambers 12 and 13. Scum troughs 17 and 18 are then rotated to their operable position and the scum, with some liquid, is skimmed from the surface of the sewage to facilitate further treatment thereof. It will be understood that the sewage treatment apparatus may comprise one or more chambers having single or multiple scum troughs.

Referring now specifically to FIGS. 2, 3 and 4, wherein is shown a detailed illustration of the structural formation of the bearing assembly 16, it will be seen that the bearing assembly comprises a generally cylindrical body portion 19 having a flange 21 extending outwardly therefrom, and a cylindrical bore 22 therethrough provided with an annular bearing surface 23 having an arcuate cross-section to allow the scum troughs 17 and 18 to misalign within the bearing assemblies. The substantially flat surface 20 of the flange 21 is positioned against the inner surfaces of walls 14 and 15 of the chambers 12 and 13 and the opposed surfaces of the wall 9 and adjustably fastened thereupon by means of a plurality of bolt assemblies 25. The flange 21 is formed with substantially parallel slots 26, 27 and 28, the latter slot extending radially outwardly in an extended portion at the lower end of the bearing assembly. The slots 26, 27 and 28 are open ended to allow vertical movement of the bearing assembly upon the chamber walls, and to allow the bearing assemblies to be mounted by lowering them upon the bolt assemblies 25. Movement of the bearing assembly 16 thus facilitates alignment of the troughs 17 and 18 within the tanks 12 and 13. All of the bearing assemblies 16 have the above-mentioned structural features.

Since the scum flows through the troughs 17 and 18 in only one direction the outside end of the trough 18 is closed by an end cap 29 as shown in FIG. 4. The bearing assembly 16 associated with the closed end does not require a sealing member 37 as shown on the bearing assembly 16 in FIG. 3. The sealing member 37, illustrated in FIG. 3, is recessed within a counter bore 38 in the bearing assembly 16 and prevents seepage of the liquid sewage.

Each of the scum troughs 17 and 18 is formed with a longitudinally extending slot 31 therein. The slots 31 provide an access opening into the cylindrical chambers 32 and 33 defined by the inner walls of the troughs 17 and 18. The two scum troughs are connected by a conduit 34 passing through the wall 9 separating the chambers 12 and 13. Scum received within the chambers 32 and 33 passes through a disposal conduit 35 positioned in the outer wall 14 of tank 12 to a suitable disposal location external to the tank. In this manner, floating scum not adaptable to further treatment in the tank of the type discussed herein is passed to the outside of the tank leaving the remaining fluid in a condition for further treatment.

The scum troughs 17 and 18 are normally positioned between the opposed walls of the chambers 12 and 13 with the slots 31 in a position above the liquid level maintained within the tanks. When a sufficient quantitiy of scum is collected in the one end of the tank, the troughs 17 and 18 are axially rotated within the bearing assemblies 16 by means of lever arm 40, so that the solts 31 assume a position relative to the liquid level allowing the floating scum to flow through the slots into the cylindrical trough chambers 32 and 33 and outward through the conduit 35. The lever arm 40 is fixed at one end to each of the troughs 17 and 18 by means of adjustable bands 41 held in position by fasteners 42. The lever arm is shown in various positions in FIG. 2. Bands 43, similar to those fastening the lever arm to the troughs, secure the troughs 17 and 18 within the bearing assemblies 16.

Referring now specifically to FIGS. 5, 6, and 7 for a detailed illustration of the structural formation of the alignment assembly it will be seen that transverse to slot 28 in flange 21 are oppositely disposed notches 44. Positioned within these notches 44 is an abutment member 46. The screw assembly 47 includes an L-shaped clip 48 disposed within a recess 51 in the flange 21 and adjacent the chamber walls. One leg 54 of the clip 48 is provided with an opening 49 to receive the bolt 25 which passes therethrough securing the clip 48 to the associated wall of the tank. An internally threaded opening 52 is formed in the leg 53 of the L-shaped clip 48 to receive the bolt 56. The legs 53 and 54 of the clip are formed at approximately a 90° angle. The abutment member is formed with an indentation matching the curvature of the end of the bolt 56 to receive the curved end of the bolt.

*Method of operation*

The bolt assemblies 25 are secured in the concrete chamber walls 9, 14 and 15 in approximately the proper location prior to installing the scum troughs 17 and 18. The bearing assemblies 16 are slipped over the ends of the scum throughs with the flat surface 20 of the flanges 21 toward the ends of the troughs 17 and 18.

The clip 47 is hung on the lower bolt 25 by means of the opening 49. Then the assembly of the scum troughs 17 and 18 and bearings 16 are lowered into the chambers 12 and 13 so that the slots 26, 27 and 28 of the flange 21 engage the bolt assemblies 25. The abutment member is then properly positioned in the notches 44 and the screw 56 is threaded through the opening 52 to engage the abutment member.

The scum troughs 17 and 18 are now positioned on the bolt assemblies 25 parallel with the surface of the liquid sewage and at the proper level to operate efficiently. To adjust the position of the scum trough the screw 56 is rotated in one direction imparting a force through the abutment member 46 to the flange 21 to raise one end of the scum trough. Rotation of the screw in the opposite direction will allow the trough to move downwardly a limited distance under the force of gravity to the proper level. When the scum troughs 17 and 18 are positioned horizontally and at the proper height, the bolt assemblies 25 are tightened to secure the scum troughs 17 and 18 within the tanks 12 and 13.

It is to be understood that the forms of this invention herewith shown and described are to be taken as the preferred examples of the same, and that various changes in the shape, size, and arrangement of parts may be resorted to without departing from the spirit of the invention or the scope of the subjoined claims.

Having thus described the invention, I claim:

1. In a tank for removing floating material from a liquid contained therein, the improvement comprising:
   a cylindrical material receiving trough rotatably mounted within bearing means secured to opposed wall portions of the tank;
   said bearing means including a generally cylindrical body portion providing a generally cylindrical interior surface, said surface being formed to provide an inwardly projecting annular bearing surface having an arcuate cross section for rotatably engaging an end portion of said trough and for permitting misalignment of the longitudinal cylinder axis of the trough with the axis of said annular bearing surface to facilitate assembling and aligning the trough within the tank; and
   means for adjusting said bearing means in securing them to the opposed tank wall portions to horizontally position said trough in the tank.

2. Apparatus as recited in claim 1, further comprising:
   said bearing means being formed with a radially, outwardly extending flange having a plurality of parallel slots formed therein;
   means cooperating with said slots for adjustably securing said bearing means to the opposed wall portions of the tank;
   an L-shaped bracket having a first leg cooperating with said securing means and positioned between the tank wall portion and said flange, and a second leg extending outwardly from the wall portion and having a threaded aperture therethrough; and
   a screw threaded into said aperture and operably connected to exert a generally vertical adjusting force on said flange.

3. Apparatus as recited in claim 2, further characterized by:

all of said parallel slots having an end opening in the same direction at the edges of said flange to facilitate securing said bearing means to the tank wall portions and to permit vertical adjustment of the bearing means relative to the tank wall portions;

said flange being formed with a recess adjacent to the wall for receiving said first leg of said bracket;

one of said slots opening into said recess and having opposed notches formed in opposite sides thereof;

an abutment member removably positioned in the notches; and said screw engaging said abutment member to exert a force thereupon for adjusting the position of the bearing means relative to the wall.

References Cited

UNITED STATES PATENTS 2,337,859    12/1943    Stuller _____ 210—525 X
2,780,361    2/1957    Evans et al. _____ 210—525 X REUBEN FRIEDMAN, *Primary Examiner.*

J. DeCESARE, *Assistant Examiner.*